Feb. 6, 1968 G. V. MOMMSEN 3,367,789
METHOD FOR MOUNTING AND MASKING A WORKPIECE
Filed Oct. 21, 1964 2 Sheets-Sheet 1

INVENTOR.
GORDON V. MOMMSEN
BY
Moore, White & Burd
ATTORNEYS

Feb. 6, 1968   G. V. MOMMSEN   3,367,789
METHOD FOR MOUNTING AND MASKING A WORKPIECE
Filed Oct. 21, 1964
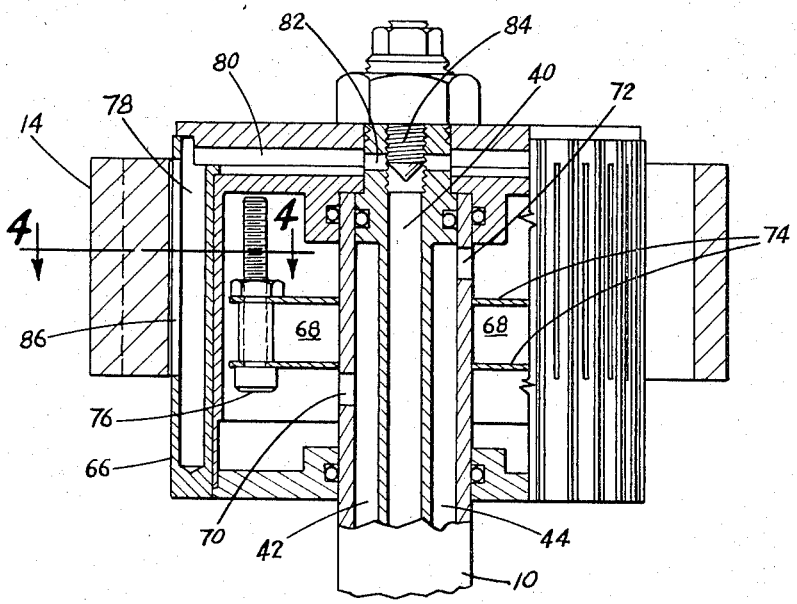
FIG. 3
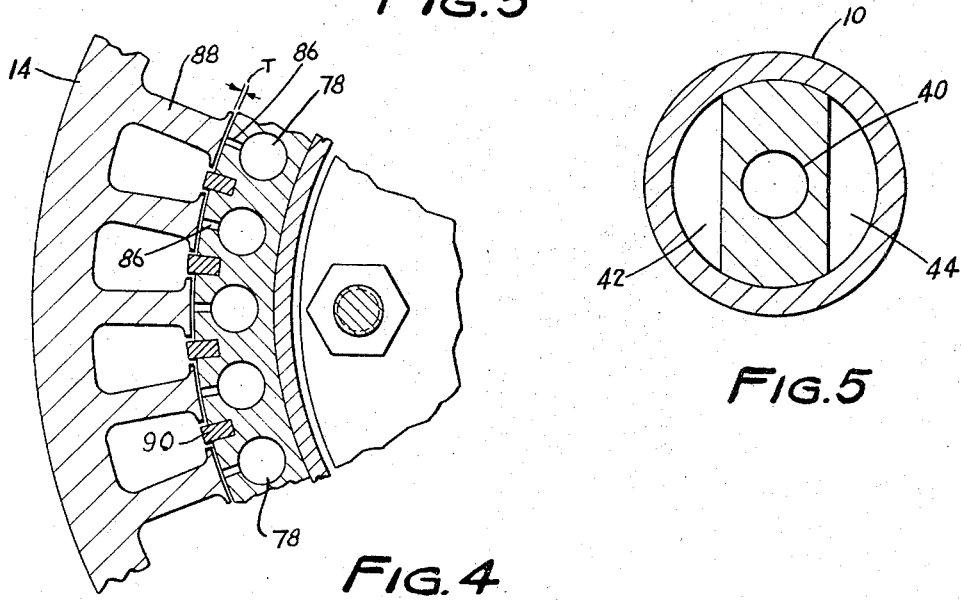
FIG. 4
FIG. 5
INVENTOR.
GORDON V. MOMMSEN
BY
Moore, White & Burd
ATTORNEYS

United States Patent Office 3,367,789
Patented Feb. 6, 1968

3,367,789
METHOD FOR MOUNTING AND MASKING A WORKPIECE
Gordon V. Mommsen, Minneapolis, Minn., assignor to Possis Machine Corporation, Minneapolis, Minn., a corporation of Minnesota
Filed Oct. 21, 1964, Ser. No. 405,336
4 Claims. (Cl. 117—18)

This invention relates in general to coating machines or more particularly to improvements in coating machines of the type in which powdered resins are directed upon a heated part which is supported upon a spindle.

In the design of coating machines of the type in which heated parts are sprayed with thermosetting resin powder, it is mandatory that two problems be overcome. The first problem arises because the spindle support becomes heated as a result of its contact with the heated workpiece which is being coated. This heat energy residing in the spindle causes the spindle itself to accept some of the powdered resin. Thus a build-up of resinous coating occurs on the spindle which inhibits smooth placement and removal of additional workpieces. Accordingly, the spindle has to be periodically cleaned which is time consuming and therefore costly.

The second problem stems from the fact that there are usually portions of the workpiece being coated from which the resinous coating must be excluded. Previously this exclusion or masking has been attempted by physical masking as by rubber plugs or by air flow. It has been discovered that improved physical masking of critical areas can be achieved with hard masks if combined with air flow.

It is an object of this invention to provide a method of excluding deposits of resins on selected portions of a workpiece to be coated.

Yet another object of this invention is to provide a method of keeping a spindle for a coating machine from overheating while supporting heated objects in continuous succession.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 3 is an enlarged partial section showing the internal construction of the spindle assembly;

FIGURE 4 is an enlarged sectional view taken on the line in the direction of the arrows 4—4 of FIGURE 3 showing the spindle assembly in conjunction with a stator core; and FIGURE 5 is an enlarged sectional view taken along the line and in the direction of the arrows 5—5 in FIGURE 1.

Figure 2:
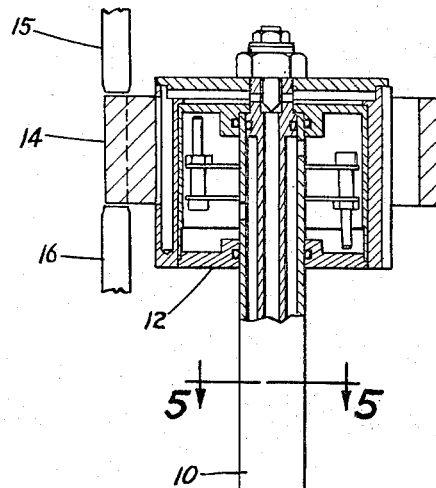
FIGURE 2 is a sectional view illustrating a part of the cooling means and taken on the line and in the direction of the arrows 2—2 of FIGURE 1.
Figure 2:
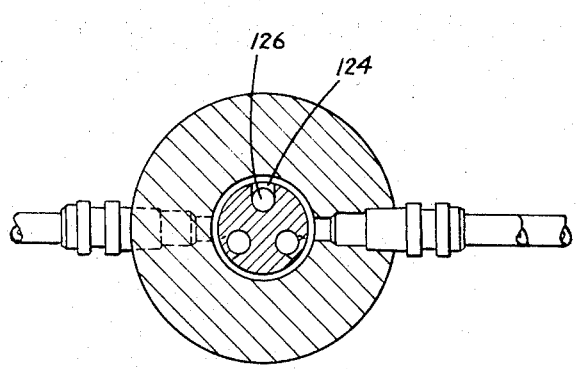

While this system of controlling the application of thermosetting resin powder to workpieces may be applicable in other instances, a very satisfactory and particularly useful application of it relates to coating certain portions of electrical machines and specifically the coil supporting core members, as stators and rotors, of electrical machines. The invention will be described specifically in relation to this application.

The coating apparatus of the invention is mounted on a table 8 which supports the various sections of the same. Extending upwardly from the table 8 is spindle shaft 10 which supports spindle assembly 12 which in turn supports the workpiece, here illustratively stator core 14. The stator core is shown in position to be coated with thermosetting resin powder which is introduced by nozzles 15 and 16. These nozzles are not per se inventive and hence are shown in fragment only to illustrate their relation to a workpiece on the spindle.

Shaft 10 is rotatably mounted at its lower end by means of hub assembly 18 in cooperation with bushings 20. The hub assembly is secured to the table 8 by means of screw fasteners 22 and includes end cap 24 which is secured by screw fasteners 25 and which is adapted to rotatably support the lever assembly 26. The lever assembly includes an inner shaft 28 which is internally threaded at 30 so as to receive the lower threaded end 32 of shaft 10. Lever arm 34 is secured to shaft 28 by key member 36. Interposedly situated between the end cap 24 and lever arm 34 is detent 38 which permits rotation of the lever assembly to desired positions yet holds a given position as the table 8 is indexed.

Figure 1:
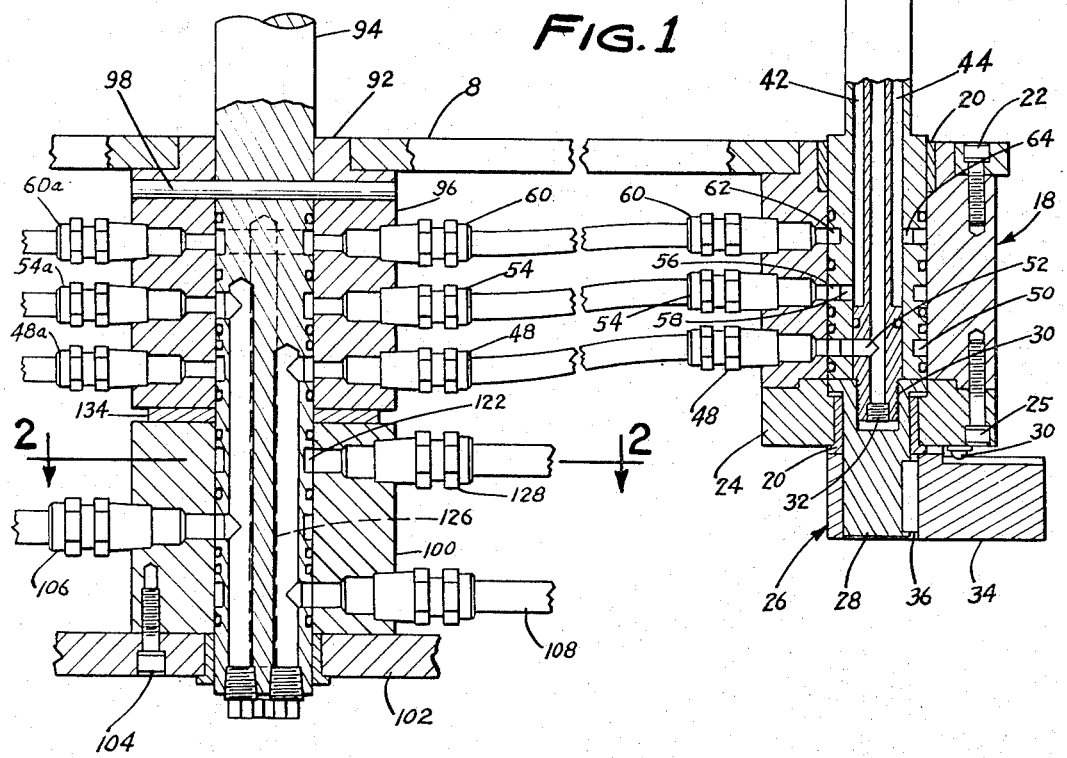
FIGURE 1 is a cross section of the coating apparatus showing the improved spindle support in conjunction with the means for supplying gaseous and liquid coolant thereto.

As best shown in FIGURES 1 and 5, the internal structure of the spindle shaft 10 comprises a centrally disposed hollow conduit 40 and a pair of diametrically opposed hollow conduits 42 and 44. The conduit 40 provides means for supplying air under pressure to the spindle assembly 12 whereas conduits 42 and 44 cooperate to provide an exchange of liquid coolant to the same, the advantage of which will be clear as the description proceeds in greater detail. Air is supplied to conduit 40 by secondary hose 48 which is in communication therewith via annular recess 50 and air inlet 52. Similarly, liquid coolant is supplied to conduit 42 by secondary hose 54 which is in communication therewith via annular recess 56 and coolant inlet 58. The coolant returns from the spindle assembly via conduit 44 and is discharged through secondary hose 60 which is in communication with conduit 40 via annular recess 62 and discharge outlet 64. In this manner, the rotation of the spindle shaft 10 will not affect the continuous transfer of air and coolant therein.

The internal structure of the spindle assembly is best described with reference to FIGURES 3 and 4. The spindle assembly includes an outer cylindrical casing 66 which is dimensioned externally so as to loosely engage the workpiece or stator core 14 in the manner of FIGURE 4. The interior of the casing is constructed so as to define a coolant supporting chamber 68 which is in communication with coolant conduit 42 via inlet 70 and the coolant return conduit 44 via outlet 72. Thus a constant exchange of liquid coolant within the spindle shaft 10 and spindle assembly 12 is achieved as coolant is supplied to the interior chamber 68 through inlet 70 in conjunction with conduit 42 and is discharged from said chamber through outlet 72 in conjunction with conduit 44.

Fixedly disposed within chamber 68 are parallel vane elements 74 which are held in counter balanced spaced relationship by bolt assemblies 76. These elements assist in dispersing the liquid coolant and thereby insure a uniform distribution of coolant to all areas of the chamber 68.

The outer casing 66 is shown having a plurality of circumferentially spaced orifices 78, each of which are in communication with a large circular recess 80 which is disposed within the casing and which is in turn in communication with air conduit 40 via a small circular recess 82. As will be readily understood, air is thus conveyed at equal pressure to each of the orifices 78 and since the orifices are always open to the interconnected circular recesses 80 and 82, the transfer of air is not affected by rotation of the spindle 10.

Set screw 84 is shown in threaded engagement at the upper end of conduit 40 and provides means for controlling the flow rate of the air to the orifices. Obviously many different sizes of spindle assemblies may be employed with a given powder spraying machine and accordingly the air flow requirements will correspondingly vary.

Extending longitudinally with the orifices 78 are slotted apertures or vents 86 which are in communication with the orifices 78 and thereby provide means for exhausting the pressurized air. The vents are arranged in a series of rows so as to form a pattern that is covered by the faces of the pole pieces 88 of the stator core 14. As shown in FIGURES 3 and 4 outer casing 66 of spindle assembly 10 is closely spaced a distance T from the pole faces. When air is introduced via conduit 40 and recesses 82 and 80 to the orifices 78, it flows outward through the vents and causes a blanket of air to constantly be exhausted around the periphery of each of the pole pieces 88. Air exhausted in this manner physically deflects particles of resin powder away from the edges of the pole pieces where it is not desirable to have the resin deposited to form a coating. As will be appreciated, the tolerance T between the stator core and casing is very small and the accumulation of resin powder therebetween would inhibit smooth placement and removal of the work piece. It is therefore of utmost importance that the pole pieces be kept clean.

Not only does the air physically deflect powder away from areas where it is not desired to have it deposited, it expands adiabatically so as to produce a cooling effect for both the spindle assembly and adjacent surfaces of the work piece as the pole faces of the coil supporting member. This expansion cooling assists in preventing the formation of a coating on the spindle assembly since the thermosetting resin powder will adhere and become a coating only on a surface at a temperature above a critical one. The cooling effect as a result of the adiabatic expansion of the air together with the cooling effect caused by the exchange of liquid coolant has been found to be extremely effective for cooling the spindle assembly and adjacent surfaces to a temperature below the critical.

As best shown in FIGURE 4, sunken keys 90 are staked to the outer surface of the casing 66 and are adapted to accurately align the stator core upon the spindle assembly. While these keys facilitate the correct placement and removal of the work piece upon the spindle assembly, their slight protrusion between the pole pieces 88 primarily acts to prevent the deposit of resinous powder on the peripheral edges of these pole pieces acting as a physical "mask" and air flow baffles to maintain slot width for ease in winding.

To simplify the disclosure, the invention has been described with reference to a single work station, i.e., only a single spindle assembly is shown mounted on the table and in conjunction with only a single work piece. However, the coating apparatus of the present invention is particularly useful when a multiplicity of work stations are involved. Accordingly, the table 8 may support several spindle assemblies and a corresponding number of hub assemblies. These assemblies are normally arranged in a circle and the table is mounted for rotation in the manner hereinafter defined to permit each spindle assembly to be sequentially advanced to the nozzles 15 and 16 which apply the coating to each work piece situated thereon. To distribute the air and liquid required by each of several work stations, there is shown the secondary manifold assembly 92, which will now be described in detail.

The manifold assembly 92 includes a main shaft 94 which is fixedly secured to upper movable hub 96 by means of pin 98. The hub 96 is secured to the table by known means and thus is adapted to rotate therewith as the table is advanced to each of the various work stations. The hub 96 constitutes a secondary manifold for the several hoses which distribute the air and liquid coolant to each of the spindle assemblies. Accordingly, hoses 48a, 54a and 60a represent additional means for supplying air and liquid coolant to another spindle assembly (not shown) in the manner similar to the hoses 48, 54 and 60 of spindle assembly 12.

At the lower end of main shaft 94 is shown stationary hub 100 which is secured to lower frame member 102 by screw fastener 104. The hub 100 constitutes a primary manifold or main source for supplying the air and liquid coolant to the secondary hoses which branch off of the movable hub 96. Accordingly, primary hose 106 constitutes a main supply source for liquid coolant and primary hose 108 constitutes a main supply source for the air. To convey the liquid coolant supplied by primary hose 106 to the secondary hoses 54 and 54a there is shown hollow conduit 110 which is in communication therewith via annular recess 112 and outlet 114. The liquid coolant enters the primary hose 106, passes upwards through the conduit 110, enters the annular recess 112 via outlet 114, and is distributed under equal pressure to each of the secondary hoses such as 54 and 54a.

In a similar manner, air enters the primary hose 108, passes upwards through conduit 116, enters the annular recess 118 via outlet 120, and is distributed under equal pressure to each of the secondary hoses such as 48 and 48a. The liquid coolant which returns from each of the spindle assemblies via the secondary hoses such as 60 and 60a enters annular recess 122, passes through outlet 124, passes downwardly through conduit 126 and discharges through hose 128.

The number 130 designates the O-ring seals which are placed at various critical points so as to prevent leakage and/or intermixing of the air and liquid coolant.

The operation of the invention is best understood by reference to the procedural steps which are sequentially performed during the coating of a stator core. After selection of a spindle assembly of appropriate size corresponding to the stator core which is to be coated, the selected spindle assembly is placed upon the spindle shaft and secured in place by a lock nut 132. The heated stator core is then placed upon the spindle assembly by aligning the pole pieces between the guide elements or sunken keys 90. At this point, the thermosetting resin powder is introduced by the nozzles 15 and 16 and the spindle assembly 12 is simultaneously rotated by actuating the lever arm 34, whereby the selected portions of the stator core are completely coated. As previously described, the adiabatic expansion of air and circulation of liquid coolant occurs simultaneously with the coating application. After the coating has been applied to the first stator core, the table 8 is rotated by known power means applied to shaft 94 and a second spindle assembly and stator core are indexed into proper position relative to the nozzles 15 and 16. As is apparent from the drawings, the lower stationary hub 100 and the primary hoses remain stationary while the shaft 94, upper hub assembly 92 and the secondary hoses rotate with the table 8. Bearing 134 is interposed between the upper and lower hub 96 and 100 to facilitate the relative motion between these hubs. At 136 is shown a lip bushing to facilitate the rotary movement of shaft 94 relative to stationary hub 100. As will be appreciated, there is thus provided apparatus which is capable of coating several stator cores by sequentially advancing the spindle assemblies to a resin applying station and which fulfills the foregoing listed objectives.

Since many modifications and variations of this invention may be made without departing from the spirit and scope thereof, the invention is not to be considered as limited to the particular details given, nor to the specific

What I claim is:

1. A method of avoiding coating selected portions of for instance stator and rotor members, wherein pole elements are each adapted to receive a field winding thereon, comprising:
   (a) loosely mounting the member upon a spindle, with the pole faces of the member being closely spaced from the spindle;
   (b) the step of loosely mounting said member including simultaneously aligning the member with respect to the spindle and substantially blocking off each space between the peripheral edges of adjacent pole faces by inserting appropriate spline means between each pair of poles;
   (c) for each pole face, separately directing a current of air to emanate from within the spindle member at an area adjacent the corresponding closely spaced pole face, whereby to maintain a flowing blanket of masking-air between each pole face and its adjacent spindle wall area and between the peripheral edges of each pole face and the adjacent spline wall; and
   (d) thereby to inhibit, on passage of coating matter in the free space between adjacent pole elements, deposition of such matter on the air-masked stator areas.

2. A method as in claim 1 wherein the air emanated from within the spindle member undergoes an adiabatic expansion as it enters the space between each pole face and the adjacent spindle wall.

3. A method as in claim 1 including the step of cooling the spindle member and the air to emanate therefrom.

4. A method as in claim 2 including the step of cooling the spindle member and the air to emanate therefrom.

References Cited
UNITED STATES PATENTS

| | | | |
|---|---|---|---|
| 2,731,947 | 1/1956 | Harder | 118—500 |
| 2,910,962 | 11/1959 | Appleton | 118—500 |
| 3,247,004 | 4/1966 | Dosser | 117—18 |
| 3,261,707 | 7/1966 | Korski et al. | 117—18 |

MORRIS KAPLAN, *Primary Examiner.*